United States Patent Office 3,618,486
Patented Nov. 9, 1971

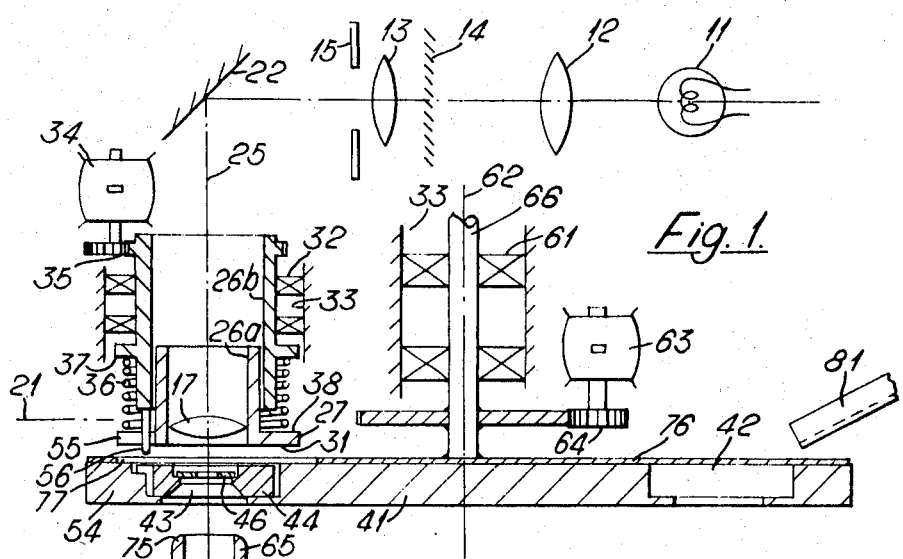
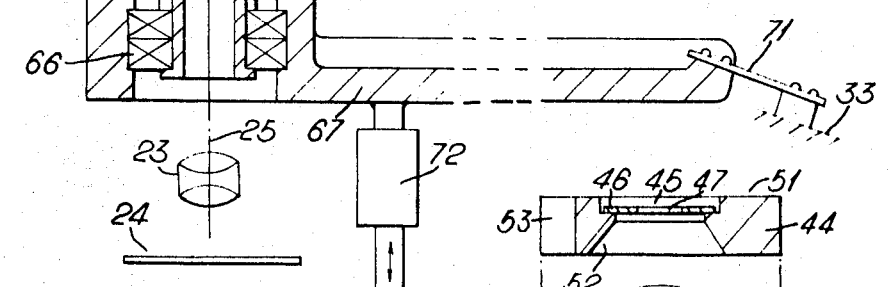
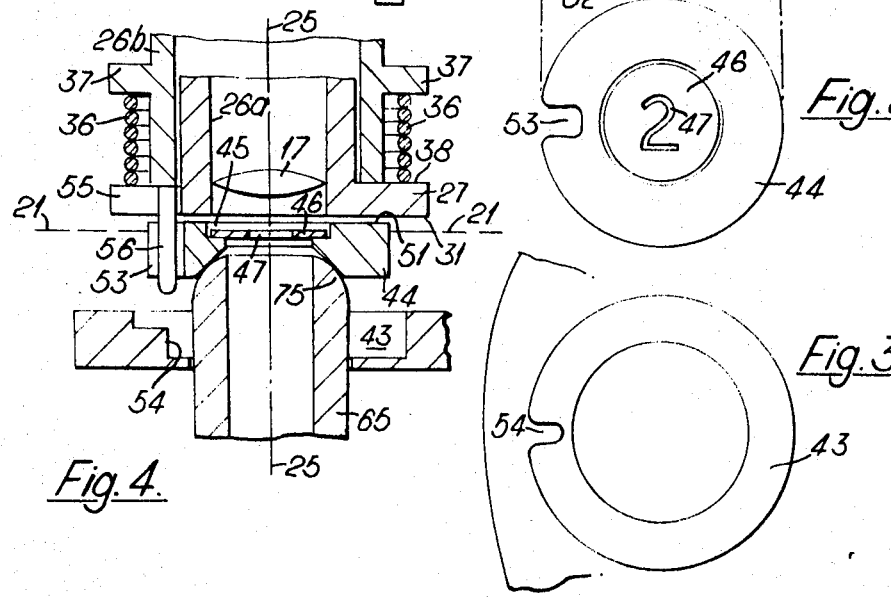
Fig. 1.
Fig. 2.
Fig. 3.
Fig. 4.

3,618,486
OPTICAL PROJECTORS
Brian Box English and Richard David Whyman, Edinburgh, Scotland, assignors to Ferranti, Limited, Hollinwood, England
Filed Aug. 12, 1970, Ser. No. 63,050
Claims priority, application Great Britain, Aug. 12, 1969, 40,274/69
Int. Cl. B41b 15/12
U.S. Cl. 95—4.5                                6 Claims

ABSTRACT OF THE DISCLOSURE

An optical projection system for projecting onto a sheet of photopaper the image of any selected one of an assortment of characters or other symbols in transparencies carried in bezel members (frames) around the rim of a magazine dics. The disc is rotatable stepwise to bring the selected symbol onto the optical axis of the projector, and a device is provided for lifting the associated bezel member upwards from the disc to bring the selected symbol into a more precise location both as regards the object plane and the optical axis of the system.

---

This invention relates to optical projectors of the type used for projecting onto a photoresponsive surface the image of a symbol, defined by an aperture in an opaque ground. The symbol may be such as to produce on the photosensitive surface a light spot, so that by setting up a relative movement between the spot and the surface a line is drawn on it. Or the symbol may be an alphanumeric or other character, including a mathematical symbol for projection onto the surface where there is no such relative movement.

It is known to include in such a projector a rotatable magazine disc carrying around its periphery a series of plates having apertures which define the size and shape of the various symbols—that is, the spots and characters—whose image is to be projected. The disc is rotatable about an axis parallel to the optical path in a stepwise manner so as to bring into register with the optical axis any selected one of the symbols carried by the magazine.

A disadvantage of such an arrangement is that it is difficult to journal the magazine disc accurately enough to locate the selected symbol with sufficient precision in the object plane of the projector and in strict alignment with the optical axis of the projector. Further, if each symbol plate is fixed relative to the magazine disc, the rotation of its image, if desired, has to be effected by some optical method, which is likely to increase the expense undesirably.

Similar arrangements are known in which the apertured plates are replaced by transparencies each of which is opaque except for a central clear portion having the shape of the symbol whose image is to be projected. The terms "plates" or "apertured plates" as used throughout this specification should accordingly be understood as including such transparencies.

A object of the present invention is to provide an optical projector of the type stated which allows the selected symbol to be more accurately located with respect to the object plane of the projector than in the known projectors of the kind above mentioned.

A further object is to provide such a projector which allows the selected symbol to be more accurately in alignment with the optical axis of the projector.

Another object is to provide such a projector which includes inexpensive arrangement for allowing the projected image of the selected symbol to be rotated.

Another object is to provide such a projector which allows the set of symbols in use to be readily changed for another set.

In accordance with the present invention, an opitcal projector for projecting onto a photosensitive surface the image of a symbol includes a source of illumination, a projector gate having an object-plane locating surface, a projection lens system, between the gate and the lens system a magazine disc having around a peripheral region a plurality of apertures each of which is arranged to support a displaceable bezel member carrying a plate having an aperture shaped to represent a symbol the image of which is to be projected, means for rotating the disc in a stepwise manner so as to bring each aperture in turn into at least approximate alignment with the optical axis of the projector between the projector gate and the projection lens system, and displacement means for displacing from the magazine disc to an operative position defined by the said object plane locating surface the bezel member supported by the aperture in such register with the optical axis, thereby locating in the object plane of the said lens system the plate, if any, carried by that bezel membe:.

In the accompanying drawings,

FIG. 1 shows partly in schematic form and partly in section an optical projection system in accordance with one embodiment of the invention, FIG. 2 shows views in plan and in section to an enlarged scale of part of the apparatus of FIG. 1.

FIG. 3 is a plan view of another part, also to an enlarged scale, and

FIG. 4 shows to an enlarged scale a part of the embodiment of FIG. 1 as in operation.

An embodiment of the invention will now be described by way of example with reference to the drawings.

Light from a lamp source 11 is projected by a lens 12 to form an image of the source in approximately the plane of a lens 13. Close to lens 13 and on the lamp side of it is a shutter device 14; close to the other side is a variable aperture 15, to control the intensity of the projected image.

Lens 13 forms an image of the illuminated aperture of lens 12 approximately in the plane of a third lens 17, and hence also approximately in a plane indicated by the broken line 21. For convenience in drawing, the optical path from lens 13 to lens 17 is shown to be by way of a plane mirror 22; but this folding of the optical path is not essential.

The plane 21 is the object plane of a projection lens system 23 which projects onto a photosensitive surface 24 the image of whatever object (the symbol to be recorded) is in that plane. Lens 17 is required to cause the light beam to converge onto the object lens system 23.

For convenience of description it will be assumed that the part of the optical axis of the projector between mirror 22 and surface 24 is vertical.

To form a projector gate, lens 17 is mounted at the lower end of a tube 26a coaxial with the optical axis 25 and with an outer tube 26b. The lower end of tube 26a is flanged at 27 to define by its lower surface 31 an object plane locating surface which in operation, as described below, is slightly above the object plane 21.

Tube 26b is journalled in bearings 32 from a part 33 of the main framework of the projector for rotation about the optical axis 25 by a motor 34 through gearings 35.

A spring 36 between a flanged part 37 of tube 26b and the upper surface 38 of flange 27 urges the inner tube 26a, and hence the object-plane locating surface 31, downwards with respect to 26b, and hence away from the object plane 21 and towards the magazine disc, to an "inoperative" position to be described later.

Between tubes 26 and lenses 23 is a magazine disc 41 having around a peripheral region a circular array of apertures shaped to support a like number of displaceable bezel members. One of these apertures is shown without its bezel member at 42. Another is shown at 43, in approximate register with optical axis 25. Its associated bezel member 44 is shown to an enlarged scale in FIG. 2.

The upper part of bezel member 44 is recessed at 45 to carry a very thin plate 46 having an aperture 47 shaped to represent a particular symbol; the figure "2" is taken as an example—see FIG. 2. The surrounding wall of the recess 45 has an upper surface 51 accurately planar and parallel to the plate 46.

The lower surface 52—see FIG. 2—of the bezel member is dished to a conical shape for a reason to be explained later.

As the angular position of the symbol ("2") is of importance, the bezel is provided with a radial notch 53 to be engaged by a rib 54 extending inwards from the outer surface of the associated aperture 43—see FIG. 3. Such indexing means are not necessary where the symbol to be projected is a circular dot. Bezel member 44 is a slightly loose fit in aperture 43 to allow the member to be displaced from the aperture during the operation of the apparatus as described below.

Extending downwards from the lower end of tube 26b of the projector gate member and passing through a slot 55 in flange 27 is a pin 56 designed to be brought into register with rib 54 of aperture 43 and hence with notch 53 of bezel member 44. The link between pin 56 and slot 55 causes the two tubes 26a and 26b to be locked together as regards rotation by the motor 34.

The magazine disc 41 is carried by a shaft 60 journalled in bearings 61 from frame 33 for rotation in a stepwise manner about an axis 62 parallel to the vertical part 25 of the optical axis by a motor 63 through gearing 64.

Between the magazine disc and lenses 23 is displacement means in the form of a tubular member 65 coaxial with optical axis 25 and journalled for rotation about that axis in bearings 66 at one end of a long beam 67. The other end of the beam is attached by a flat spring 71 to the frame 33 to allow the tube 65 to be displaced along axis 25 in the manner to be described. The beam is long enough for the tube to remain coaxial with axis 25 to a sufficient degree of accuracy despite such displacement. The movement is effected by means of a solenoid 72 operating near the free end of the beam.

The end of tube 65 nearer disc 41 has its outer surface 75 of a spherical shape capable of engaging the facing surface 52 of bezel member 44.

As a protection against dust, the upper surface of the magazine disc 41 is covered by a thin plate 76 which is fixed against rotation and has an aperture 77 over only the aperture 43 which is in register with the projector. This cover is omitted from FIG. 4 to simplify the drawing.

In the inoperative condition of the apparatus, the angular positions of the tubes 26a and 26b, as controlled by motor 34, is such that the pin 56, which projects downwards from the lower end of tube 26b, is in register with the radial notch 53 in the bezel member 44. The axial position of tube 26a, as urged downwards by the spring 36, is such that the tip of pin 56 and the undersurface 31 of flange 27 are just clear of the upper surface of the magazine disc 41 and so allow the disc to rotate. Tube 26a is retained in this position by some sort of link (not shown), such as a pin and slot, between it and tube 26b. Each aperture in the disc is deep enough to contain the associated bezel member with its upper surface 51 below the level of the upper surface of the disc. The light from lamp 11 is blocked by the closing of the shutter device 14.

In operation, motor 63 is energised to rotate the magazine disc stepwise to bring into approximate alignment with optical axis 25 the aperture and bezel member associated with the symbol whose image is to be projected. Aperture 43 and bezel member 44 are in that position in FIG. 1.

Solenoid 72 is then energised to flex beam 67 upwards and so raise tube 65 to bring its spherical outer surface 75 into engagement with the conically dished surface 52 (see FIG. 2) of member 44. Such engagement brings the plate into accurate alignment with axis 25, as determined by the accurate alignment with that axis of the centre of the spherical surface 75 of the tube 65.

Further upward movement of the tube raises the bezel member out of the supporting aperture to bring the planar upper surface 51 of the bezel member into contact with the planar surface 31 of the projector gate member.

The spacing between surfaces 31 of flange 27 and 51 of the bezel member when in its inoperative position, supported by the magazine disc, is sufficiently close to prevent the bezel member from becoming sufficiently skew during its upward transfer on tube 65 towards surface 21 as to become jammed askew on reaching that surface.

The continued upward movement of tube 65 carries tube 26a and the bezel member in contact with it towards tube 26b against the pressure of spring 71 until the limit is reached when the upper surface 38 of flange 31 engages the lower end surface of tube 26b. The bezel member is then in its operative position.

The selected symbol is now not only in closer alignment with the optical axis 25 but is in a position defined by the object plane locating surface 31 such that the plate 46 and its symbol are located in the object plane 21. The apparatus is thus in what may be called its operative condition. This is illustrated in FIG. 4 which shows the relevant components of FIG. 1 to an enlarged scale. For clarity, the engaging surfaces 31 and 51 (of tube 26a and bezel member 44) are depicted slightly apart.

During the upward movement, just described, of the bezel member, the pin 56 projecting downwards from tube 26b enters notch 53 in the bezel member. The pin is long enough for this to happen before the bezel member has been raised far enough above the supporting aperture to carry notch 53 clear of the rib 54, which occurs before the operative condition has been reached, and is tapered in a direction which is circumferential as regards the magazine disc (and therefore normal to the plane of the paper in FIGS. 1 and 4) to engage notch 53 tightly. Thus the angular position of the symbol is kept under control.

With the apparatus now in its operative condition, shutter 14 is opened, thereby causing an image of the selected symbol to be projected onto the photosurface 24.

If when the apparatus is in the operative condition it is desired to rotate the symbol image, motor 34 is energised to rotate both the tube 26. This rotation is imparted to the bezel member by the pin 56, and accepted by the tube 65 because it is journalled in bearings 66. As the bezel member has been fully withdrawn from the aperture which previously supported it, rib 54 cannot prevent this rotation.

A highly accurate positioning of the symbol whose image is to be projected has thus been attained without requiring any expensive precision of journalling of the magazine disc.

After the symbol has been recorded, motor 34 is energised to bring pin 56 into register with rib 54, assuming that there has been some rotation of the bezel member as described above. The solenoid 72 is then de-energised to allow beam 67 and with it tube 65 to fall back to the position depicted in FIG. 1, thereby causing the bezel member to return to aperture 43 in the magazine. During this downward movement, the spring-biased tube 26a follows the bezel member downwards part of the way and so prevents it from regaining aperture 43 in a skew condition. Pin 56 may be surrounded by a coiled compression spring (not shown) to ensure that the bezel member is disengaged from the pin as tube 65 falls away.

The magazine disc is thus free to rotate to bring another symbol to the operative position.

It is usually better for surface 75 on tube 65 to be spherical, as described, rather than conical and complementary to surface 52. If they were both conical, the plane of surface 51 would be fixedly determined as soon as tube 65 has been raised sufficiently to engage the bezel member 44. For satisfactory operation, the plane so defined would have to be strictly parallel to plane 31 of tube 26a to ensure that the two planes mated exactly when they came into engagement as shown in FIG. 4. To achieve this without very precise and hence expensive engineering could usually be impracticable. By making one or both of surfaces 75 and 52 spherical, the plane of surface 51 is free to be defined by surface 31 only.

Where a rapid change of symbol is required, a slideway 81 may be provided to deliver the bezel members carrying the symbol plates one at a time into the apertures 42 in the magazine disc. Starting outside the disc periphery, the slideway, which has the width of one bezel member, extends radially inwards and downwards towards the disc.

To install the plates, the disc is rotated stepwise to bring each aperture 42 in turn into register with the slideway. After each such adjustment the bezel member concerned is caused to slide down the slideway to drop from the end of it into the aperture.

When this sort of loading system is in use, it is usually better for the ribs 54 (FIG. 3) to be located diametrically opposite the position shown—that is, they should be located in the position nearest the magazine centre—and each bezel member delivered notch 53 forwards to ensure the notch and rib engagement.

In an alternative arrangement, to enable whole sets of symbol plates to be readily changed, a separate magazine disc is provided for each set and an easily operated form of coupling is provided to allow the selected magazine to be attached to the shaft 60 for rotation in bearings 61.

What we claim is:

1. An optical projector for projecting onto a photosensitive surface the image of a symbol, including
    a source of illumination,
    a projector gate having an object-plane locating surface,
    a projection lens system,
    between the gate and the lens system a magazine disc having around a peripheral region a plurality of apertures each of which is arranged to support a displaceable bezel member carrying a plate having an aperture shaped to represent a symbol the image of which is to be projected,
    means for rotating the disc so as to bring each aperture in turn into at least approximate alignment with the optical axis of the projector between the projector gate and the projection lens system,
    and displacement means for displacing from the magazine disc to an operative position defined by the said object plane locating surface the bezel member supported by the aperture in such register with the optical axis, thereby locating in the object plane of the said lens system the plate, if any, carried by that bezel member.

2. A projector as claimed in claim 1 in which the displacement means is such as to locate the displaced plate in closer alignment with said optical axis.

3. A projector as claimed in claim 2 in which the displacement means includes
    a tubular member coaxial with said axis and located between the magazine disc and the projection lens system, the end on the member which is nearer the disc having a surface shaped to engage the facing surface of the said bezel member,
    and means for moving the tubular member to bring said surfaces into engagement, such engagement bringing the plate into said closer alignment, and thereafter displacing the bezel member from the magazine disc to the position defined by the object plane locating surface.

4. A projector as claimed in claim 3 wherein the displacement means includes means for urging the object-plane locating surface away from the object plane and towards the magazine disc to an inoperative position sufficiently close to the said bezel member to prevent it from becoming undesirably skew on the tubular member when displaced from the magazine disc.

5. A projector as claimed in claim 1 which further further includes indexing means to define the angular position of each bezel member when supported by the magazine disc, and with reference to the projector gate when the member is in its operative position.

6. A projector as claimed in claim 4 with means for rotating a bezel member when in its operative position.

References Cited

UNITED STATES PATENTS

| | | | |
|---|---|---|---|
| 1,893,439 | 1/1933 | Ogden | 95—4.5 |
| 2,653,526 | 9/1953 | Peery | 95—4.5 |
| 2,775,172 | 12/1956 | Higonnet et al. | 95—4.5 |
| 3,486,429 | 12/1969 | Nobuo Morisawa | 95—4.5 |

JOHN M. HORAN, Primary Examiner

T. A. MAURO, Assistant Examiner